No. 828,738. PATENTED AUG. 14, 1906.
N. G. HANNA.
BUNCHER ATTACHMENT FOR MOWING MACHINES.
APPLICATION FILED MAR. 25, 1904.
5 SHEETS—SHEET 2.
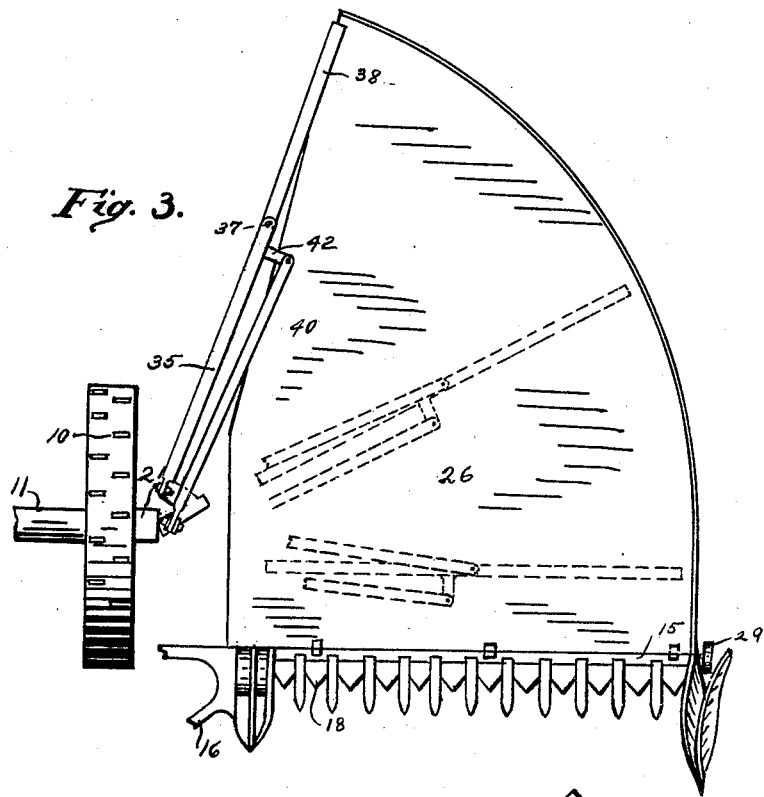
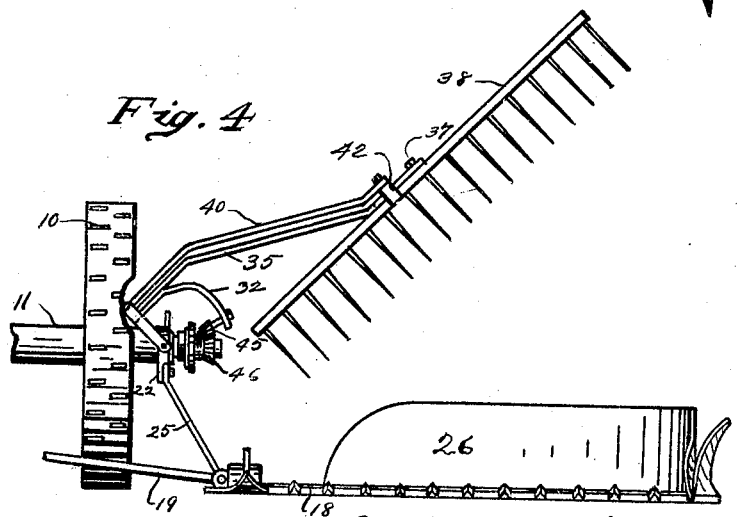

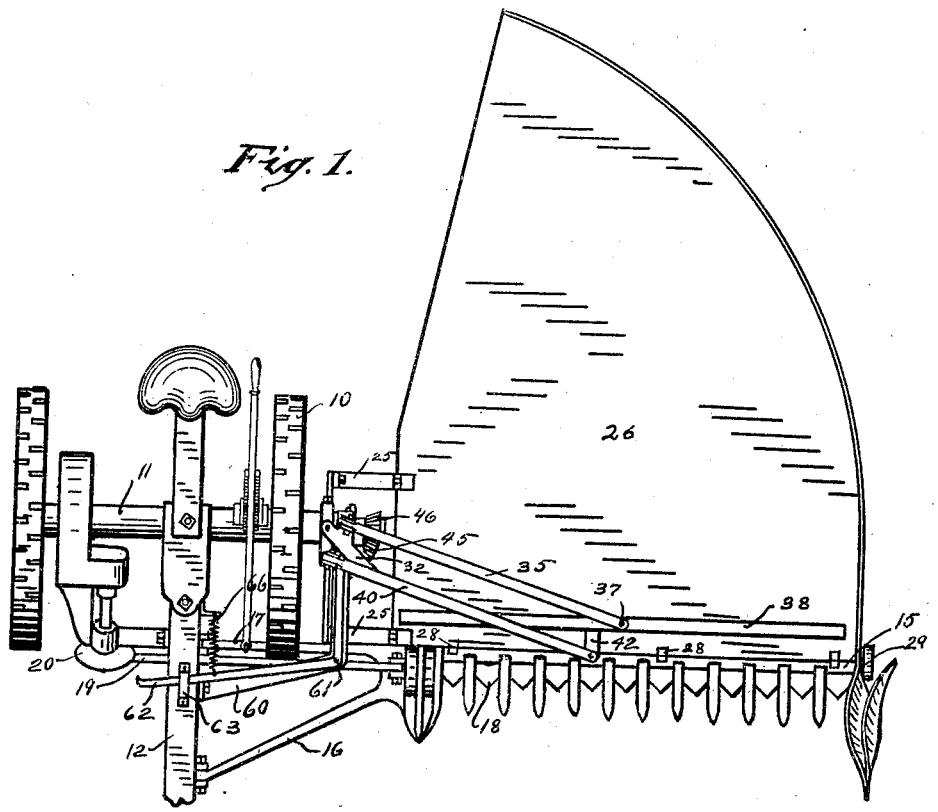

No. 828,738. PATENTED AUG. 14, 1906.
N. G. HANNA.
BUNCHER ATTACHMENT FOR MOWING MACHINES.
APPLICATION FILED MAR. 25, 1904.
5 SHEETS—SHEET 3.
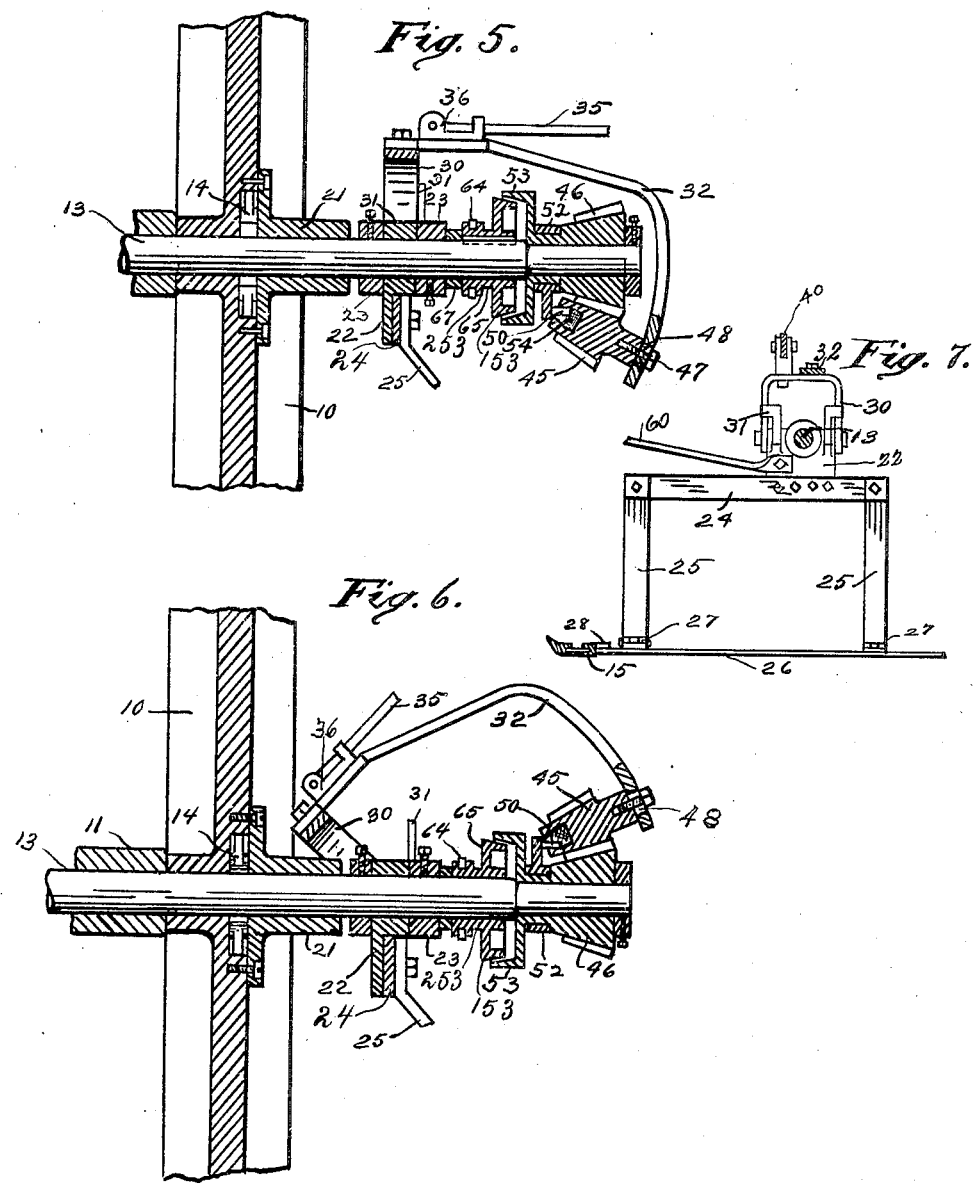

No. 828,738. PATENTED AUG. 14, 1906.
N. G. HANNA.
BUNCHER ATTACHMENT FOR MOWING MACHINES.
APPLICATION FILED MAR. 25, 1904.

5 SHEETS—SHEET 4.

Witnesses
H. S. Stuart

Inventor
Nelson G. Hanna,
By W. H. Lockwood
Attorney

No. 828,738. PATENTED AUG. 14, 1906.
N. G. HANNA.
BUNCHER ATTACHMENT FOR MOWING MACHINES.
APPLICATION FILED MAR. 25, 1904.
5 SHEETS—SHEET 5.
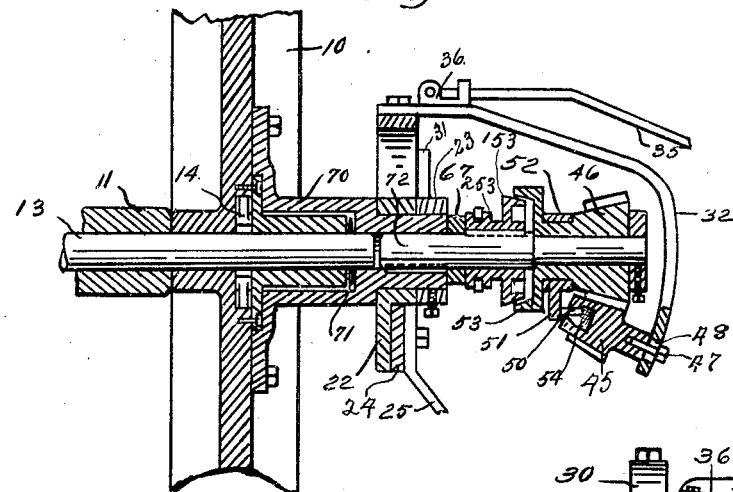
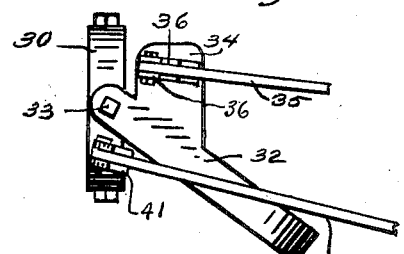
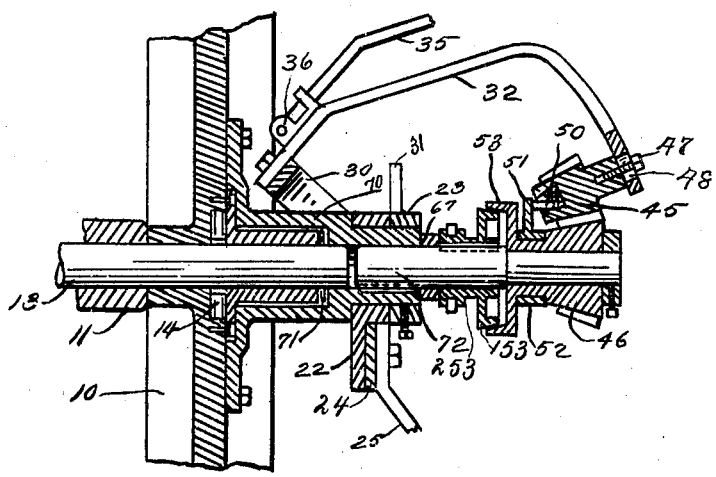

UNITED STATES PATENT OFFICE.

NELSON G. HANNA, OF KOKOMO, INDIANA, ASSIGNOR OF THREE-FOURTHS TO VIRGIL H. LOCKWOOD, OF INDIANAPOLIS, INDIANA.

BUNCHER ATTACHMENT FOR MOWING-MACHINES.

No. 828,738.　　　　Specification of Letters Patent.　　　　Patented Aug. 14, 1906.

Application filed March 25, 1904. Serial No. 199,943.

*To all whom it may concern:*

Be it known that I, NELSON G. HANNA, of Kokomo, county of Howard, and State of Indiana, have invented a certain new and useful Buncher Attachment for Mowing-Machines; and I do hereby declare that the following is a full, clear, and exact description thereof, reference being had to the accompanying drawings, in which like numerals refer to like parts.

The object of this invention is to provide improvements in the construction of buncher attachments for mowing-machines so as to render the same practical and satisfactorily operative.

This buncher attachment belongs to the type of machine wherein a rake is mounted at the inner end of the axle or side of the inner drive-wheel, as shown in my former applications for side-delivery bunchers, Serial No. 109,848, filed June 2, 1902, and Serial No. 151,515, June 15, 1903.

One improvement herein resides in the means for moving and holding the rake during its movement so that the rake will closely approach and parallel the cutter-bar.

Another novel feature consists in the means for effecting the rake movement.

Another novel feature consists in the manner of mounting the platform whereby it can be folded along with the rake without difficulty.

These and the other features of the invention will appear from the accompanying drawings and the following description and claims.

Figure 8:
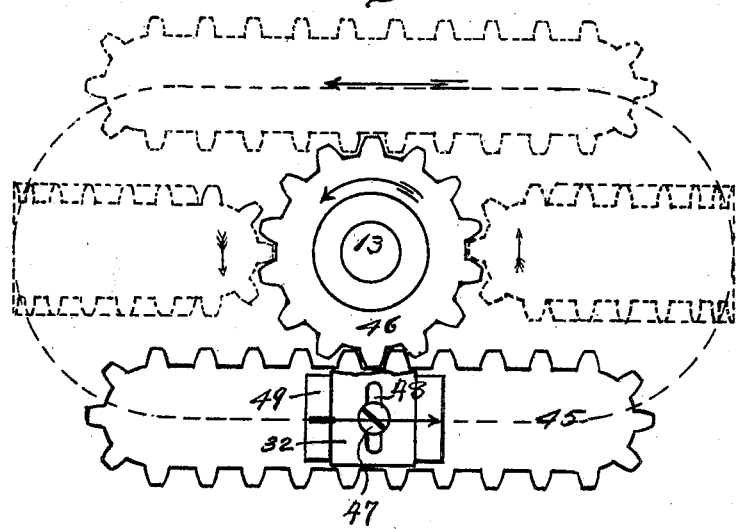
Figure 9:
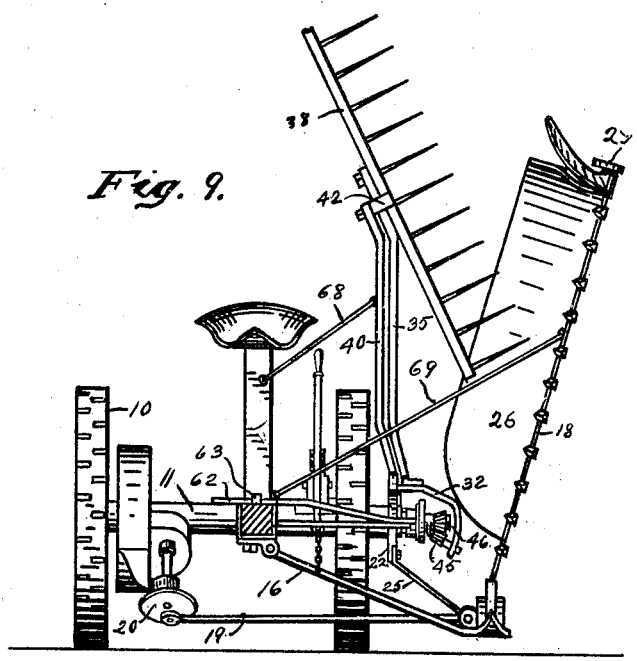

In the drawings, Figure 1 is a plan view of the machine with the tongue broken away. Fig. 2 is a front elevation of the machine with the tongue in cross-section. Fig. 3 is a plan view of the platform, cutter-bar, drive-wheel, and rake mechanism, parts being broken away and the rake mechanism being shown near its rearward limit of movement, other positions of the rake being shown by dotted lines. Fig. 4 is a front elevation of what is shown in Fig. 3, parts being broken away and the rake being shown elevated and on its return movement. Fig. 5 is a vertical longitudinal section of the axle and driving parts of the machine on a large scale, parts being broken away. Fig. 6 is the same, showing the rake-supporting means in the upward or elevated position. Fig. 7 is a side elevation of the platform and platform-supporting means, the cutter-bar and axle being shown in cross-section. Fig. 8 is an end elevation of the driving means on an enlarged scale, different positions of the long gear being shown in dotted lines. Fig. 9 is a front elevation of the machine with the tongue in section, showing the machine with the rake and platform folded up. Fig. 10 shows a modified construction of what appears in Fig. 5. Fig. 11 shows a modified construction of what is shown in Fig. 6. Fig. 12 is a plan view of the inner ends of the rake-bars and the means on which they are mounted, the rake-bars being partly broken away.

In detail the drawings herein show the drive-wheels 10 and intermediate sleeve 11, on which the tongue 12 is mounted. There is also shown an axle 13, that is driven by the drive-wheels by means of the clutch mechanism 14, common in such machines. A cutter-bar 15 is connected with the tongue or frame of the machine by braces 16 and 17, and the knife 18 is driven by the pitman-rod 19 and the knife-driving means 20. All of the foregoing parts are old and common and may be made in any suitable way, as my invention consists in a mower attachment adapted to be secured to the inner or cutting end of the axle of the machine, as will hereinafter appear.

Turning to Figs. 5 and 6, the axle 13 is shown extended beyond the inner drive-wheel 10, and the extreme end of said axle is reduced somewhat in diameter. Upon the axle adjacent the hub or clutch-cover 21 of the wheel 10 a stationary frame 22 is loosely mounted and held from lateral movement by collars 23, secured on the axle. Said frame has a downwardly-extending portion, to which a cross-bar 24 is secured, as shown in Fig. 7. This bar is horizontal and extends longitudinally of the machine and at each end has a downwardly-extending bar 25, and a platform 26 is connected with said downwardly-extending bars 25 by hinged members 27, as shown in Fig. 7. This construction is to permit the platform to be folded up and to support the inner edge of the platform while the machine is in use.

The platform is detachably connected with the cutter-bar 15 by brackets 28. The outer end of the cutter-bar, and therefore of the platform, is supported by a small wheel 29, mounted on the outer end of the cutter-bar.

Upon the frame 22, that is loosely mounted on the axle, I have pivoted a stirrup 30, as shown in Fig. 7. This stirrup is pivoted at its lower end and is limited in its outward movement by stops 31. (Shown in Fig. 7.) This permits said stirrup to be turned inward toward the drive-wheel, as shown in Fig. 6. Upon said stirrup I pivot the upper and inner end of a curved frame-plate 32 by the bolt 33, as shown in Fig. 12. The upper and inner end of said frame-plate 32 is normally horizontal, as shown in Fig. 10; but said plate is curved downward and outward, as therein shown. The upper and inner end of said frame-plate is widened by the rearwardly-extending plate 34, or it may be widened in any other manner, and to the rear of such widened portion or plate 34 I mount the main rake-supporting bar 35 between the vertical ears of the bracket 36, so that said rake-bar may have vertical oscillatory movement, but no horizontal movement independent of said frame-plate 32, the purpose being that such rake-bar shall be moved laterally by the movement of said frame-plate 32. As shown in Figs. 1 and 2, the rake-bar 35 extends outward and downward and by means of the bolt 37 is pivoted substantially centrally to the top of the rake 38. An auxiliary rake-bar 40 is similarly mounted on the top of the stirrup 30 by means of a bracket 41, pivoted on said stirrup. Said rake-bar is formed similar to and extends parallel with the rake-bar 35 and is pivoted to an arm 42, extending forwardly from the rake 38. The rake-supporting bar 35 is at its inner end supported by the bracket 36 and the plates 34 and 32, so as to support the weight of the rake somewhat and hold it out of forcible contact with the platform. The stops 31 assist in accomplishing this result, as they prevent the stirrup from passing outward beyond the vertical position.

The rake is actuated and moved by the movement of the lower end of the frame-plate 32, which carries a long movable endless bevel-rack 45, which is externally toothed and meshes with a bevel-pinion 46, mounted on the outer end of the axle 13. Said rack 45 is rigidly secured to the frame-plate 32 by means of a screw-bolt 47, which passes through a vertical slot 48 in said plate, as seen in Fig. 5. As shown in Fig. 8, there are two ribs 49 on the outer face of the endless movable rack, between which the lower end of the frame-plate 32 is secured, the purpose of such construction being to firmly unite said two parts together so that said rack will have no play independently of the frame-plate 32. Said movable rack 45 is always horizontal and is held so by said plate 32 and travels in the manner indicated in Fig. 8, being moved by the pinion 46 in the directions indicated by the arrows. As the rake is sweeping the bunch across the platform the movable rack is in the position shown in full lines in Fig. 8—that is, on the under side of the pinion. As the rake is discharging the bunch from the platform the movable rack is in the position shown by the dotted lines on the right side of Fig. 8. During the return movement of the rake and while the same is elevated the movable rack is in the position shown by the dotted lines in the upper part of Fig. 8. When the rake is moved downward into position near the cutter-bar, the movable rack is in the position shown by the dotted lines at the left side of Fig. 8. Said movable rack is held in mesh with the pinion 46 by the frame-plate 32, the outward and downward movement of which is limited, as heretofore stated, by the stops 31, that prevent the stirrup 30 from moving outward beyond the vertical position. (Shown in Fig. 5.) The frame-plate 32 is assisted in holding the movable rack in mesh with the bevel-gear by a pin 50, extending outward from and secured to an arm 51 from a band 52, loosely surrounding the inner or hub portion of the pinion 46 adjacent the clutch member 53. Therefore said arm 51 and pin 52 are in the nature of a crank, turning on and independently of the pinion 46 and clutch member 53. The pin 50 extends and works loosely in a longitudinal recess 54 in the inner face of the movable rack. Said recess approaches within substantially the same distance of the outer surface of said rack not only along the bottom and top, as shown in Fig. 10, but also the same distance from the ends, the purpose being that said pin shall hold, or rather aid in holding, the movable rack in mesh with the pinion 46 at all times. Therefore the pin 50 moves independently of the movable rack longitudinally through the recess 54 in said rack, and when the rack is on the under side, as shown in Fig. 5, the pin holds it up against the pinion. It holds the rack down when it is above the pinion, as shown in Fig. 6, although in that position the strain on the pin 50 is not very great, because gravity assists in holding the rake in mesh with the pinion. When the ends of the rack come in mesh with the pinion, as shown in Fig. 8, the pin 50 is of service in holding the rack in mesh with the pinion as the rack passes about the pinion. Therefore as the machine operates, the axle, through the pinion 46, moves the rack 45 around said pinion, as indicated in Fig. 8, and gives to the lower outer end of the frame-plate 32 a substantially elliptical movement, as indicated by the dotted line in Fig. 8, and such movement of the frame-plate 32 communicates a corresponding movement to the rake, and the vertical movement of the frame-plate as it moves about the ends of its elliptical course elevates and lowers the rake. The upper position of said frame-plate and rake-bars is shown in Figs. 4, 6, and 11.

The mounting of the rake-bar 35, in connection with the plate 34 and the frame 22, and also the regulating-bar 40 with the rake 38, holds and moves the rake substantially according with the lines indicated in Fig. 3. In other words, the lengths of the rake-bars 35 and 40 and their pivotal connections are relatively such that when the frame-plate 32 reaches its forward limit of movement as the rake passes forward and downward over the pinion the rake will be parallel with the cutter-bar and close enough thereto to rake the material from the front part of the platform. As the frame-plate 32 passes rearward the rake will be moved rearward and it will assume an angle to the cutter-bar that increases gradually as it moves to the rear, so that as it reaches the rear side-delivery edge of the platform it will be substantially parallel with such edge of the platform and nearly at a right angle to the cutter-bar, and while the outer ends of the rake-bars remain substantially the same distance apart the inner ends will be moved apart slightly as the rake moves to the rear.

The clutch consists of a clutch member 53 integral or rigidly connected with the pinion 46 and another clutch member 153, that has a hub 253 integral with it, said clutch member and hub being splined on the spindle 72 and the member 153 adapted to frictionally engage the member 53.

The frame 22 has a brace-plate 60 secured to it and extending around the forward portion of the drive-wheel 10 and secured rigidly to the side of the tongue or frame of the machine. Upon said plate at 61 a clutch-lever 62 is fulcrumed with one end extending across the tongue under a guiding-strap 63, and the other end is provided with a yoke 64, partially surrounding the hub 253 of the clutch member 153, splined on the spindle 72. A spring 66 (seen in Fig. 1) is connected at one end with the clutch-lever 62 and at the other end with the frame of the machine, so that said spring, which is contractile, will throw said clutch members into engagement, and the clutch members are disengaged by the foot of the operator pushing the lever 62 forward.

A washer 67 is placed between the clutch member 65 and the adjacent collar 23. While the machine is being moved from one place to another without cutting, the rake can be thrown up into the position shown in Fig. 9 and held by the hooked rod 68, and the platform can be thrown up, as shown in Fig. 9, and held by the hooked bar 69.

A modified form of a part of the construction is shown in Figs. 10 and 11. There a supplemental hub 70 is secured to the side of the drive-wheel 10, with the reduced portion of the supplemental hub resting upon the extreme end of the axle 13. The axle in this form is of the usual length and not extended, as shown in the other form. 71 is a pin through the axle. In the reduced portion of the supplemental hub there is a spindle 72, secured so that the rotation of the wheel and the supplemental hub will cause the rotation of the spindle just the same as the axle in the other form. The frame 22 is mounted on the reduced portion of the supplemental hub between the enlarged portion thereof and a collar 23. Otherwise the construction is exactly the same as what has been described. In other words, this rake mechanism is shown detachably secured to and supported by the axle only or the axle and wheel, as in Figs. 10 and 11. The supplemental hub is not only secured to the wheel, but rests on the end of the axle.

What I claim as my invention, and desire to secure by Letters Patent, is—

1. The combination with a mowing-machine having a driving-wheel and axle, of a stationary frame mounted on the axle outside the driving-wheel, a rake mechanism mounted in connection with said frame, a pinion mounted on the axle outside said frame so as to be driven thereby, and means actuated by said pinion for operating the rake.

2. The combination with a mowing-machine having an axle, of a rake, a platform, means mounted on the axle for carrying the platform and the rake, and means for actuating said rake.

3. The combination with a mowing-machine having an axle, of a rake, a platform, means mounted on the axle for carrying the platform and the rake, and for operating the rake.

4. The combination with a mowing-machine having a drive-wheel and an axle, of a frame mounted beside the drive-wheel and at the end of the axle outside the drive-wheel, a rake mechanism pivotally mounted on said frame so that it can be elevated, a platform hinged to said frame along its inner edge so that it can be folded toward the machine, and means connected with the machine for holding said rake and platform in their elevated positions.

5. The combination with a mowing-machine having a drive-wheel, an axle and a cutter-bar suitably hinged so it can be elevated, of a frame mounted at the end of the axle beside the wheel with a pair of downwardly-extending bars or arms, and a platform secured to the cutter-bar and hinged to said bars or arms so that it can be folded up with the cutter-bar, and means for holding the platform and cutter-bar in an upturned position.

6. In a buncher attachment for mowing-machines, a rake, a member adapted to be rotated by the mowing-machine, a pinion mounted on and driven by said rotated member, an externally-toothed endless rack that meshes with said pinion and is elongated longitudinally of the machine, said rack being provided with a longitudinally-extended recess in one face thereof, an arm mounted rotatably and concentric with the axis of the pinion and having a pin in its outer end that extends into the recess in said rack for holding the rack in mesh with the pinion, and means connected with said rack that gives the rake its raking movement and also elevates and returns the rake.

7. In a buncher attachment for mowing-machines, a rake mechanism, a member adapted to be rotated by the mowing-machine, means for actuating the rake mechanism that is mounted on said rotated member and driven thereby, and a stationary frame that supports said rake mechanism which is mounted on said rotated member between the rake-actuating means and the point of connection of the buncher attachment with the mowing-machine.

8. In a buncher attachment for mowing-machines, a rake, a member adapted to be rotated by the mowing-machine, a stationary frame mounted on said rotated member, mechanism for carrying the rake that is pivotally mounted on said frame, and means on said rotated member between the frame and the rake and driven by said rotated member that moves said rake-supporting means and gives the rake its raking movement and elevates and returns the rake.

9. In a buncher attachment for mowing-machines, a rake, a member adapted to be rotated by the mowing-machine, a stationary frame mounted on said rotated member, a stirrup pivotally mounted on said frame and extending upward so that the top thereof may be oscillated on a line parallel with said rotated member, means for carrying the rake that is pivoted on said stirrup so as to be movable horizontally, and means mounted on and driven by said rotated member for giving said rake-supporting means horizontal and vertical movement.

10. In a buncher attachment for mowing-machines, a rake, a member adapted to be rotated by the mowing-machine, a stationary frame mounted thereon, a stirrup pivoted to said frame and extending upward so that the top will be oscillatory on a line parallel with the rotated member, a frame pivoted to the top of said stirrup so as to be horizontally movable and with its free end extending outward and over the end of said rotated member, a pinion mounted on the rotated member near its outer end, means actuated by said pinion for moving the free end of said movable frame successively horizontally and vertically, and a rake-carrying bar pivoted at its inner end upon said frame and moved thereby.

11. In a buncher attachment for mowing-machines, a rake, a member adapted to be rotated by the mowing-machine, a stationary frame mounted on said rotated member, a stirrup pivoted to said frame and extending upward so that the upper end will be oscillatory in a line parallel with the rotated member, a frame pivoted to the upper part of said stirrup so as to be horizontally movable and with the outer end extending down near the outer end of the rotated member, a pinion mounted on the rotated member near its outer end and driven thereby, means driven by said pinion for moving the outer end of said movable frame in a substantially elliptical course, and a rake-supporting bar mounted on said movable frame.

12. In a buncher attachment for mowing-machines, a rake, a member adapted to be rotated by the mowing-machine, a stationary frame mounted on said member, a stirrup pivoted upon said frame and extending upward so as to be oscillatory in a line parallel with said rotated member, a frame pivoted to the upper part of said stirrup so as to be horizontally movable and with its outer end extending downward near the outer end of the rotated member, a pinion on said rotated member near the outer end thereof and driven thereby, an externally-toothed elongated endless rack secured rigidly to said movable frame and in mesh with said pinion, means for holding the rack in mesh with the pinion, and a rake-supporting bar pivoted upon said movable frame so as to be moved by the movement of the movable frame.

13. In a buncher attachment for mowing-machines, a rake, a member adapted to be rotated by the mowing-machine, a stationary frame mounted on said member, a stirrup pivoted upon said frame and extending upward so as to be oscillatory in a line parallel with said rotated member, a frame pivoted to the upper part of said stirrup so as to be horizontally movable and with its outer end extending downward near the outer end of the rotated member, a bevel-pinion on said rotated member near the outer end thereof and driven thereby, an externally-toothed elongated endless bevel-rack secured rigidly to said movable frame and in mesh with said pinion, means for holding the rack in mesh with the pinion, and a rake-supporting bar pivoted upon said movable frame so as to be moved by the movement of the movable frame.

14. In a buncher attachment for mowing-machines, a rake, a member adapted to be rotated by the mowing-machine a stationary frame mounted on said member, a stirrup pivoted upon said frame and extending upward so as to be oscillatory in a line parallel with said rotated member, a frame pivoted to the upper part of said stirrup so as to be horizontally movable and with its outer end extending downward near the outer end of the rotated member, a pinion on said rotated member near the outer end thereof and driven thereby, an externally-toothed elongated endless rack provided with ribs on the back thereof between which the outer end of said movable frame fits snugly, means for securing said movable frame to said rack, means for holding the rack in mesh with said pinion, and a rake-supporting bar mounted on said movable frame so as to be moved by the movement of the movable frame.

15. In a buncher attachment for mowing-machines, a rake, a member adapted to be rotated by the mowing-machine, a stationary frame mounted on said rotated member, a stirrup pivotally mounted on said frame and extending upward so that the top thereof may be oscillated on a line parallel with said rotated member, a frame for carrying the rake which frame is pivoted on said stirrup so as to be movable horizontally, and a rake-supporting bar pivotally mounted on said movable frame so as to be vertically oscillatory independently of said movable frame and horizontally movable with said movable frame.

16. In a buncher attachment for mowing-machines, a rake, a member adapted to be rotated by the mowing-machine, a stationary frame mounted on said rotated member, a stirrup pivotally mounted on said frame and extending upward so that the top thereof may be oscillated on a line parallel with said rotated member, a frame for carrying the rake which frame is pivoted on said stirrup so as to be movable horizontally, a rake-supporting bar pivotally mounted on said movable frame, means mounted on and driven by said rotated member for giving said rake-supporting bar horizontal and vertical movement, and means for limiting the oscillatory movement of said stirrup toward the rake.

17. In a buncher attachment for mowing-machines, a rake, a member adapted to be rotated by the mowing-machine, a stationary frame mounted on said rotated member, a stirrup pivoted upon said frame and extending upward so as to be oscillatory in a line parallel with said rotated member, a frame pivoted to the upper part of said stirrup so as to be horizontally movable and with its outer end extending downward near the outer end of the rotated member, a pinion on said rotated member near the outer end thereof and driven thereby, an externally-toothed elongated endless rack secured rigidly to said movable frame and in mesh with said pinion, means for holding the rack in mesh with the pinion, a rake-supporting bar pivoted upon said movable frame so as to be moved by the movement of the movable frame, and means for limiting the oscillatory movement of said stirrup toward the rake-bar so that it will through said movable frame hold said rack upward in mesh with said pinion when the rack is on the under side of the pinion and will also support the rake through means of the rake-supporting bar.

18. In a buncher attachment for mowing-machines, a rake, a rake-supporting bar pivoted at its outer end to the rake so that the rake will oscillate horizontally thereon, means that moves the rake-supporting bar horizontally, and means that oscillates said rake horizontally on the outer end of its supporting-bar.

19. In a buncher attachment for mowing-machines, a rake, a rake-supporting bar pivoted at its outer end to the rake so that the rake may oscillate horizontally thereon, a rake-regulating bar substantially parallel with the rake-supporting bar and located horizontally beside the same, means extending horizontally from the rake to which said rake-regulating bar is pivoted, means not movable longitudinally of the machine to which the end of one of said bars is pivoted, and means to which the inner end of the other one of said bars is connected that horizontally moves said bar for actuating the rake whereby the rake will be caused to oscillate horizontally on its supporting-bar.

20. In a buncher attachment for mowing-machines, a rake, a rake-supporting bar pivoted at its outer end to the rake so that the rake may oscillate horizontally thereon, means to which the inner end of said bar is secured that moves said bar horizontally and actuates the rake, a rake-regulating bar substantially parallel with and beside the rake-supporting bar, means extending from the rake horizontally to which one end of said rake-supporting bar is pivoted, and means on substantially the same horizontal level as the rake-actuating means to which the inner end of said rake-regulating bar is pivoted.

21. In a buncher attachment for mowing-machines, a rake, a member adapted to be rotated by the mowing-machine, means mounted on said rotated member that is not movable longitudinally of the machine, a plate pivoted upon said means so as to be horizontally movable, means mounted on and driven by said rotated member for horizontally moving said plate, a rake-supporting bar mounted on said plate so as to move therewith, and a rake-regulating bar that is substantially parallel with said rake-supporting bar which is pivoted to the rake at its outer end and at its other end is pivoted to the means on which said plate is pivoted.

22. In a buncher attachment for mowing-machines, a rake, a member adapted to be rotated by the mowing-machine, a stationary frame mounted on said rotated member, a stirrup pivoted to said frame extending upward so that the upper part thereof is oscillatory in a line parallel with said rotated member, a plate pivoted at one end to the top of said stirrup, means mounted on and driven by the rotated member for moving said plate horizontally on its pivot, a rake-supporting bar mounted at its inner end on said plate so as to move horizontally therewith, and a rake-regulating bar substantially parallel with the rake-supporting bar and pivoted at its outer end to the rake and at its inner end to said stirrup.

23. In a buncher attachment for mowing-machines, a rake, a member adapted to be rotated by the mowing-machine, a stationary frame mounted on said member, a rake-supporting means mounted on said stationary frame, a pinion mounted on said rotated member between the stationary frame and the rake, means actuated by said pinion for operating the rake, a clutch on said rotated member between the stationary frame and the pinion for throwing the pinion into and out of operation, and means for controlling said clutch.

24. In a buncher attachment for mowing-machines, a rake, a member adapted to be rotated by the mowing-machine, a stationary frame mounted on said member, a rake-supporting means mounted on said stationary frame, a pinion mounted on said rotated member between the stationary frame and the rake, means actuated by said pinion for operating the rake, a clutch on said rotated member between the stationary frame and the pinion for throwing the pinion into and out of operation, means for controlling said clutch, and a spring for holding said clutch in engagement with said pinion.

25. In a buncher attachment for mowing-machines, a rake, a platform, a rotary member, a stationary frame mounted on said rotated member with a pair of downwardly-extending arms to which the platform along its inner edge is hinged so that the platform can be folded up, a stirrup pivotally mounted on said frame and extending upward so as to be oscillatory in a line parallel with the rotated member, a rake-supporting means pivotally mounted on said stirrup so that said rake may be folded up, and means mounted on and driven by said rotated member for operating the rake.

In witness whereof I have hereunto affixed my signature in the presence of the witnesses herein named.

NELSON G. HANNA.

Witnesses:
V. H. LOCKWOOD,
GERTRUDE FOLTZ.